(12) United States Patent
Kawakami et al.

(10) Patent No.: US 6,263,139 B1
(45) Date of Patent: Jul. 17, 2001

(54) OPTICAL TRANSMISSION SYSTEM WITH GROUP VELOCITY DISPERSION COMPENSATION

(75) Inventors: Hiroto Kawakami; Yutaka Miyamoto, both of Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/436,707

(22) Filed: Nov. 9, 1999

(30) Foreign Application Priority Data

Nov. 9, 1998 (JP) .................................................. 10-318106

(51) Int. Cl.$^7$ ...................................................... G02B 6/02
(52) U.S. Cl. ................................................ 385/123; 359/161
(58) Field of Search ...................................... 385/123–126, 385/147; 359/173, 161, 162, 125, 124, 130, 106, 134, 179; 372/21, 22, 23, 43, 50, 96

(56) References Cited

U.S. PATENT DOCUMENTS

| 5,361,319 | * | 11/1994 | Antos et al. | 385/123 |
| 5,602,666 | * | 2/1997 | Ishikawa et al. | 359/161 |
| 5,612,807 | * | 3/1997 | Ishikawa et al. | 359/161 |
| 5,636,046 | * | 6/1997 | Ishikawa et al. | 359/161 |
| 5,696,614 | * | 12/1997 | Ishikawa et al. | 359/124 |
| 5,920,588 | * | 7/1999 | Watanabe | 372/96 |

FOREIGN PATENT DOCUMENTS

| 0 903 877 A2 | 3/1999 | (EP) . |
| 6-11620 | 1/1994 | (JP) . |
| 10039155 | 2/1998 | (JP) . |
| 11084440 | 3/1999 | (JP) . |

OTHER PUBLICATIONS

"Raman amplification for loss compensation in dispersion compensating fibre modules" Hansen et al, Electronics Letters, May 28, 1998, vol. 34, No. 11.

"A 17 Gb/s Long–Span Fiber Transmission Experiment Using a Low–noise Broadband Receiver with Optical Amplification and Equalization" Hagimoto et al., Opto–Electronics Laboratories, Optical Amplifiers and Their Applications, Aug. 6–8, 1990 1990 Technical Digest Series, vol. 13.

"Dispersion–Compensation–Free 400–Gbit/s (10–channel ×40–Gbit/s) Transmission Experiment Using Zero–Dispersion–Flattened Transmission Line" Yonenaga et al. NTT Optical Network System Laboratories, Third Optoelectronics and Communications Conference, Technical Digest pp. 6–7, Jul. 1998.

* cited by examiner

Primary Examiner—Akm E. Ullah
(74) Attorney, Agent, or Firm—Venable; Robert J. Frank

(57) ABSTRACT

To suppress S/N degradation due to optical amplification and generation of a nonlinear optical effect in a dispersion compensating fiber, and compensate for a loss due to the dispersion compensating fiber without incorporating a long fiber inside a receiver, part of an optical transmission line is constructed by a dispersion compensating fiber and at least part of the optical transmission line is designed to have a Raman gain or a distributed gain. A pump light to obtain a Raman gain or a distributed gain is transmitted from at least one of a transmitter, a receiver, and a repeater to the optical transmission line.

22 Claims, 8 Drawing Sheets

OPTICAL TRANSMISSION SYSTEM WITH GROUP VELOCITY DISPERSION COMPENSATION

This application is based on patent application Ser. No. 10-318106(1998) filed on Nov. 9, 1998 in Japan, the content of which is incorporated hereinto by reference.

BACKGROUND OF THE INVENTION

1. Field of the Invention

The present invention relates to an optical transmission system using an optical transmission line partly having a gain, in which a group velocity dispersion is not uniform with respect to a longitudinal direction.

2. Description of the Prior Art

When transmitting a high-speed, large-capacity optical signal, a deterioration of optical waveform due to a group velocity dispersion of a transmission optical fiber is a problem. To compensate for this waveform deterioration, it is effective to install a dispersion compensating fiber in a receiver, which fiber is designed to cancel the dispersion and dispersion slope of the transmission optical fiber.

A loss due to a dispersion compensating fiber is in general so large that cannot be neglected. To compensate for this loss, it is effective to install a lumped optical amplifier inside the receiver, or induce the distributed gain, such as a Raman gain to a dispersion compensating fiber using the optical pumping source which is installed in the receiver.

FIG. 6 shows the configuration of a prior art optical transmission system in which a dispersion compensating fiber is followed by an optical amplifier. In FIG. 6, numeral 1 indicates a transmitter, 2 is a receiver, 3 is an optical fiber forming an optical transmission line, 11 is an optical transmission circuit, 21 is a dispersion compensating fiber, 22 is an optical amplifier, and 23 is an optical receiver circuit.

Signal light received by the receiver 2, after being dispersion compensated by the dispersion compensating fiber 21, is amplified by the optical amplifier 22, and received by the optical receiver circuit 23. FIG. 6 also shows a power diagram, showing that the input power to the optical amplifier 22 is considerably reduced due to a loss of the dispersion compensating fiber 21.

FIG. 7 shows the configuration of a prior art optical transmission system installed with an optical amplifier in front of the dispersion compensating fiber. In FIG. 7, numeral 1 indicates a transmitter, 2 is a receiver, 3 is an optical fiber forming an optical transmission line, 11 is an optical transmission circuit, 22 is an optical amplifier, 21 is a dispersion compensating fiber, and 23 is an optical receiver circuit.

Signal light received by the receiver 2 is amplified by the optical amplifier 22, dispersion compensated by the dispersion compensating fiber 21, and received by the optical receiver circuit 23. FIG. 7 also shows a power diagram, in which the input power to the dispersion compensating fiber 21 is increased to more than a certain level by the optical amplifier 22, so as to compensate for the loss of the dispersion compensating fiber 21 and prevent S/N deterioration in the optical receiver circuit 23 (K. Hagimoto et al., OAA'90, Technical Digest, TUA2, 1990).

FIG. 8 shows the configuration of a prior art optical transmission system in which Raman gain is induced in the dispersion compensating fiber. In FIG. 8, numeral 1 indicates a transmitter, 2 is a receiver, 3 is an optical fiber forming an optical transmission line, 11 is an optical transmission circuit, 21 is a dispersion compensating fiber, 23 is an optical receiver circuit, 24 is a optical pumping source, 25 is a pumping light coupler, and 26 is an isolator.

Signal light received by the receiver 2 is dispersion compensated by the dispersion compensating fiber 21 and received by the optical receiver circuit 23. The dispersion compensating fiber 21 is backward pumped using pumping light coupler 25, and blocked by the isolator 26. FIG. 8 also shows a power diagram, showing that loss and Raman gain in the dispersion compensating fiber 21 are balanced and the optical power is maintained at a constant value (P. B. Hansen., Elec. lett., 34, pp1136–1137, 1998).

However, as shown in FIG. 6 and FIG. 7, in the configuration where the optical amplifier 22 is disposed in the receiver 2, the signal quality is deteriorated for the reason described below. That is, when the optical amplifier 22 is placed after the dispersion compensating fiber 21 (FIG. 6), due to a loss by the dispersion compensating fiber 21 in addition to a loss L of the optical fiber 3, SIN of the main signal light is degraded at the output of the optical amplifier 22, resulting in a degradation of the sensitivity of the optical receiver circuit 23.

When the optical amplifier 22 is placed in front of the dispersion compensating fiber 21 (FIG. 7), since the dispersion compensating fiber 21 is smaller in core diameter than an ordinary fiber, it is necessary to limit the output level of the optical amplifier 22 to a level at which a nonlinear optical effect induced in the dispersion compensating fiber 21 can be neglected, thus limiting a loss compensation range of the dispersion compensating fiber 21.

On the other hand, when Raman gain is induced in the dispersion compensating fiber 21 (FIG. 8), waveform degradation of the main signal caused by a nonlinear optical effect, which restrict the system performance of the configuration shown in FIG. 7, can be relaxed. However, S/N of main signal light received by the optical receiver circuit 23 is determined by the loss L of the optical fiber transmission line 3, which cannot be improved any further. To utilize a Raman gain, the dispersion compensating fiber 21 is required to have a length of several tens of km, which increases propagation delay inside the receiver 2, resulting in an increased delay in the optical transmission system.

SUMMARY OF THE INVENTION

It is therefore an object of the present invention to provide an optical transmission system which suppresses S/N degradation caused by the optical amplification and nonlinear optical effect in the dispersion compensating fiber and compensates for a loss due to the dispersion compensating fiber without incorporating a long fiber inside the receiver.

In accordance with the present invention, the re is provided an optical transmission system in which part of an optical transmission line is constructed by a dispersion compensating fiber and designed so that at least part of the optical transmission line has a distributed gain. However, to suppress a nonlinear optical effect, the dispersion compensating fiber is not disposed at immediately after a transmitter except for a case where the entire optical transmission line has a gain. Pump light to induce a distributed gain is transmitted to the optical transmission line from at least one of a transmitter, a receiver, and a repeater.

With such a configuration, since part or entire of the optical transmission line has no loss, a loss L in a transmission section becomes small compared to the prior art configuration shown in FIGS. 7 and 8, optical power received by the optical receiver circuit can be sufficiently high even when launched power to the dispersion compensating fiber is restricted. That is, while performing dispersion compensation by the dispersion compensating fiber and suppressing a nonlinear optical effect, its loss can be compensated for. Further, since the dispersion compensating fiber comprises part of the optical transmission line, it is not necessary to incorporate a long dispersion compensating fiber inside the receiver.

In the optical transmission system according to the present invention, the optical transmission line is constructed by transmission optical waveguides and dispersion compensating optical waveguides, and part or all of them are induced a distributed gain, thereby compensating for signal light loss due to dispersion compensating optical waveguides while suppressing degradation of signal quality to a minimum.

That is, by reducing loss of the optical transmission line, it becomes possible to simultaneously achieve an increase in optical power received by the optical receiver circuit and a limitation of launched power to the optical transmission line, of which the former contributing to improvement of S/N of received signal, and the latter contributing to suppression of waveform degradation caused by nonlinear optical effects such as self-phase modulation.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
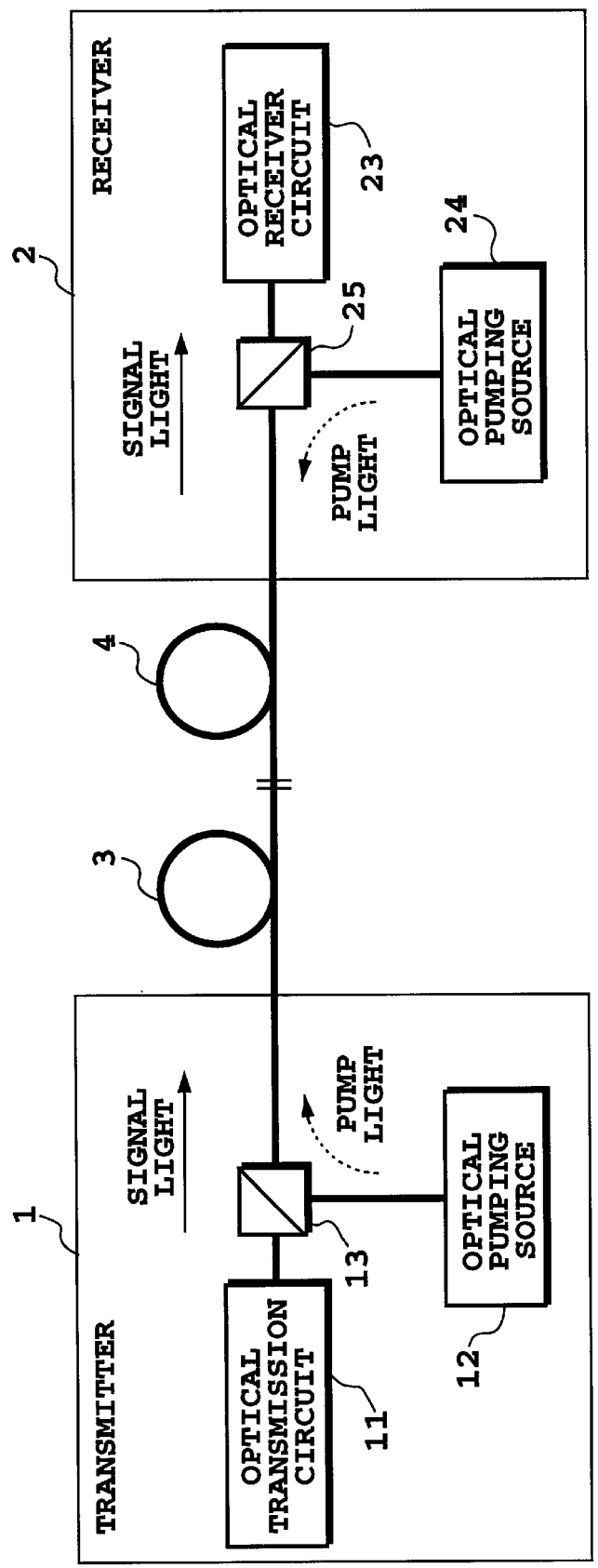
FIG. 1 is a block diagram showing a basic configuration of the optical transmission system according to the present invention.

FIG. 1 shows a basic configuration of the optical transmission system according to the present invention.

In FIG. 1, a transmitter 1 and a receiver 2 are connected through an optical fiber 3 and a dispersion compensating distributed fiber amplifier 4 constituting an optical transmission line. However, the optical fiber 3 is disposed at the transmitter side and the dispersion compensating distributed fiber amplifier 4 is disposed at the receiver side. The dispersion compensating distributed fiber amplifier 4 is an optical fiber having a distributed gain with a function to compensate for a group velocity dispersion of the optical fiber 3.

The transmitter 1 comprises an optical transmission circuit 11 for transmitting a signal light, a optical pumping source 12 for outputting pump light for forward pumping excites the dispersion compensating distributed fiber amplifier 4, and a pumping light coupler 13 for coupling the pump light with the signal and launching these coupled lights to the optical transmission line. The receiver 2 comprises an optical receiver circuit 23 for receiving the signal light, a optical pumping source 24 for outputting a pump light for backward pumping excites the dispersion compensating distributed fiber amplifier 4, a pumping light coupler 25 for launching the pump light in a direction reverse to the signal light.

With the above construction, pump lights are launched from the front side and the rear side of the dispersion compensating distributed fiber amplifier 4, signal light transmitted in the optical fiber 3 and the dispersion compensating distributed fiber amplifier 4 is dispersion compensated and amplified before it is received by the receiver 2. However, pumping is not always necessary to be performed bidirectionally, and it is possible to omit one of the two directions. Further, the optical fiber 3 may be provided with a distributed gain. In this case, pump light outputted from the transmitter 1 is mainly used for pumping the optical fiber 3.

Figure 2:
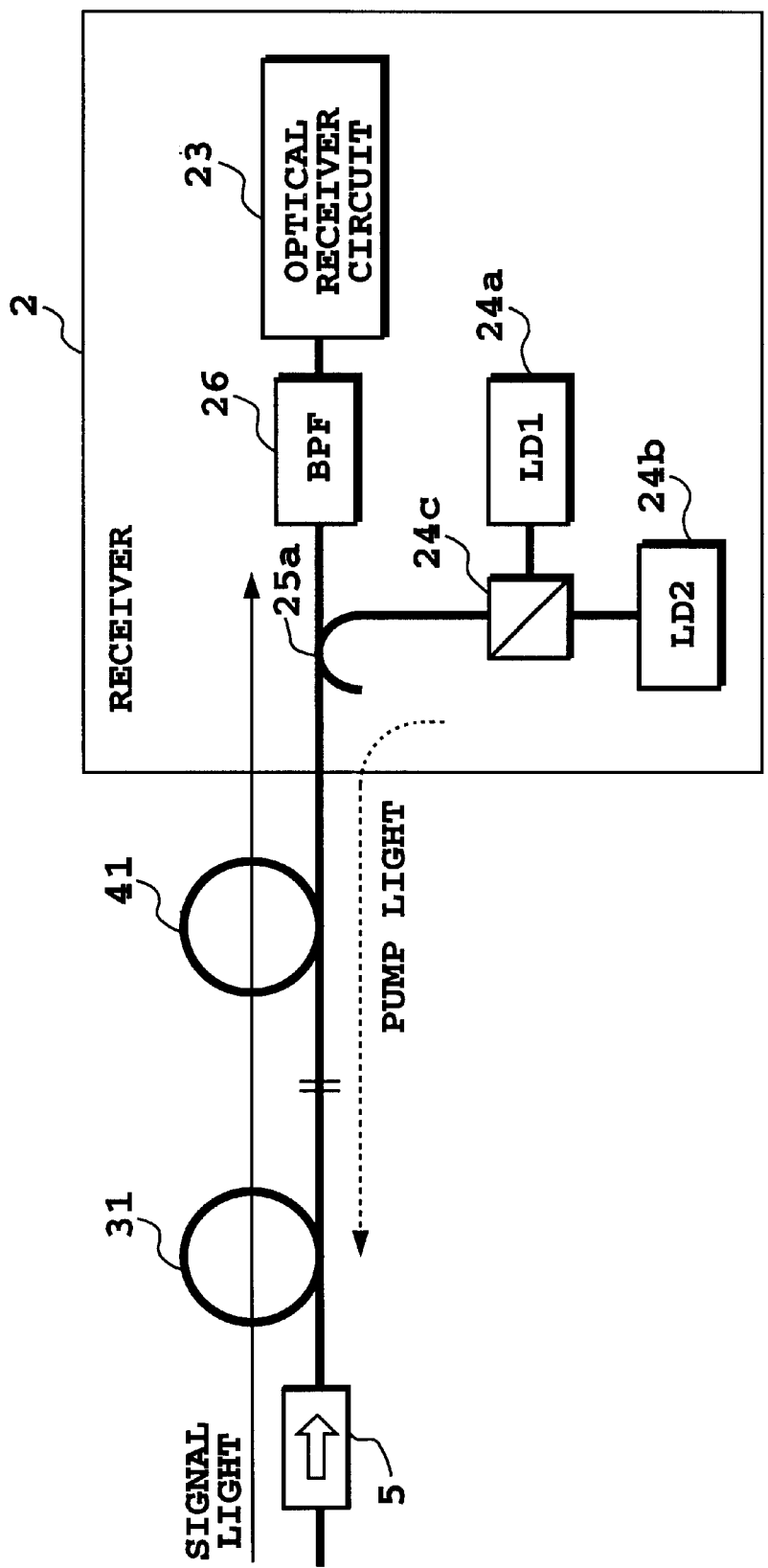
FIG. 2 is a block diagram showing a first embodiment of the optical transmission system according to the present invention.

FIG. 2 shows a first embodiment of the optical transmission system according to the present invention. Here, a configuration is shown in which pumping light is launched from the receiver side to the dispersion compensating distributed fiber amplifier, and the configuration of the transmitter is omitted. In the following, detailed configuration of each part will be described comparing with the basic configuration of FIG. 1.

For the optical fiber 3 and the dispersion compensating distributed fiber amplifier 4, a single mode fiber 31 and a dispersion compensating fiber 41 using silica as a base material are used. The dispersion compensating fiber 41 is the reverse in the sign of the dispersion and dispersion slope, and it is designed so that the dispersion and the dispersion slope are zero in the vicinity of 1.5 $\mu$m as the entire optical transmission line.

Signal light of wavelength 1.5 $\mu$m outputted from the transmission station (out of the figure) is launched to the single mode fiber 31 through an isolator 5. Signal light outputted from the single mode fiber 31 is launched to the dispersion compensating fiber 41.

The optical pumping source has a configuration to make polarization multiplexing and outputting to eliminate polarization dependence of Raman gain of the dispersion compensating fiber 41. Here, laser light outputted from a first semiconductor laser (LD 1) 24a and a second semiconductor laser (LD 2) 24b is polarization multiplexed by a polarization multiplexing circuit 24c and outputted. The pumping light coupler uses a WDM (wavelength division multiplexing) coupler 25a. Polarization multiplexed pump light is launched to the dispersion compensating fiber 41 in the reverse direction to the signal light through the WDM coupler 25a. An optical circulator may be used instead of the WDM coupler 25a.

A carrier frequency difference between pump light and signal light is set to be equal to a Raman shift (about 9.5 THz) of silica. Signal light is Raman amplified by the dispersion compensating fiber 41 and received by the receiver 2, and received by the optical receiver circuit 23 through the WDM coupler 25a and an optical bandpass filter (BPF) 26. Raman gain may also be induced in the single mode fiber 31, when the pump light intensity is sufficiently high.

The optical bandpass filter 26 is used to block Stokes wave spontaneously emitted in the dispersion compensating fiber 41. The isolator 5 is disposed mainly to prevent pump light from mixing to the transmitter.

Figure 3:
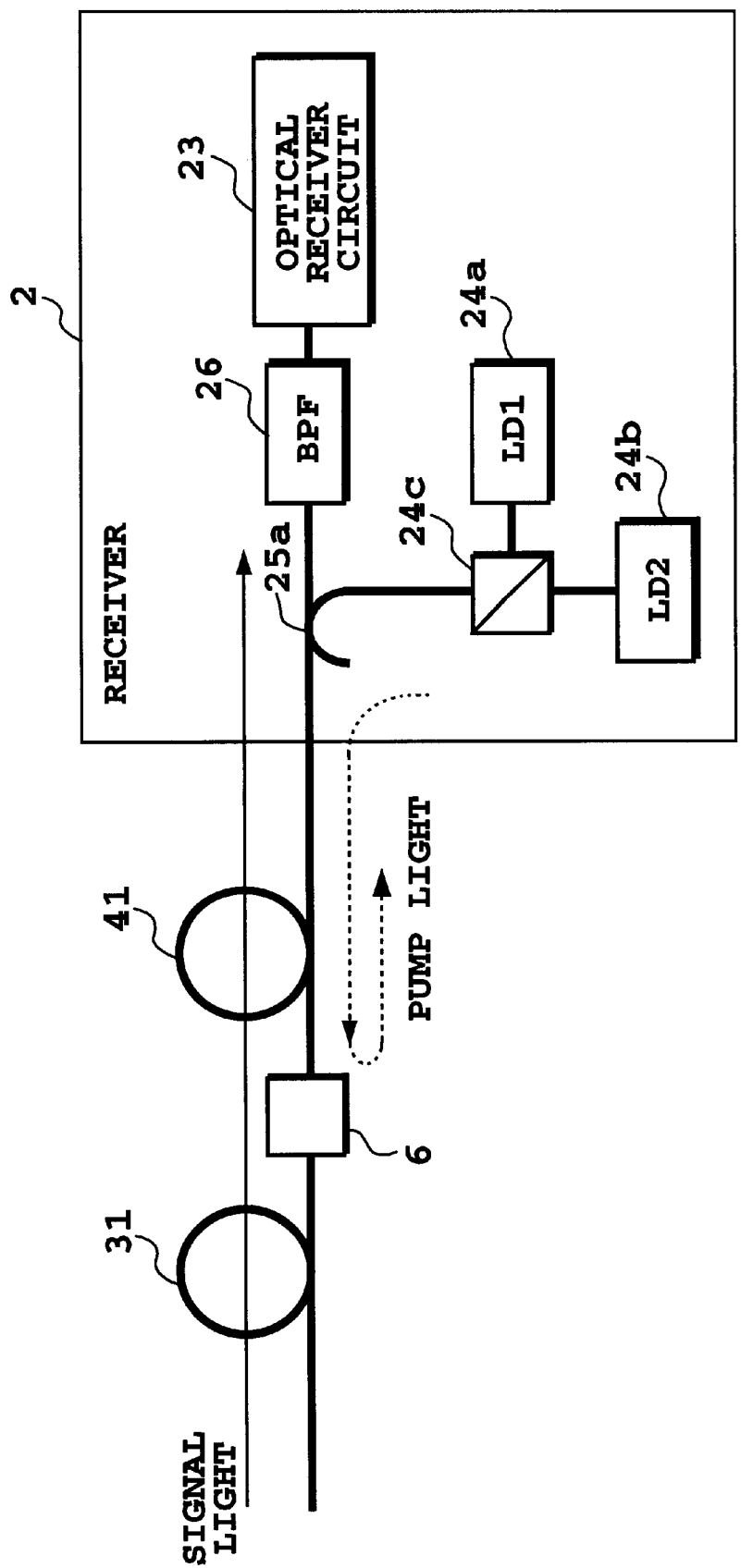
FIG. 3 is a block diagram showing a second embodiment of the optical transmission system according to the present invention.

FIG. 3 shows a second embodiment of the optical transmission system according to the present invention. Here, a configuration is shown in which pump light is launched from the receiver side to the dispersion compensating distributed fiber amplifier, and the configuration of the transmitter is omitted.

The present embodiment is characterized by using an optical filter 6 which transmits the signal light wavelength and reflects the pump light wavelength, disposed between the single mode fiber 31 and the dispersion compensating fiber 41 in place of the isolator 5 in the first embodiment. Other configuration is the same as in the first embodiment. Pump light reaching the optical filter 6 is reflected there, and launched again to the dispersion compensating fiber 41. This enables efficient pumping. By providing a wavelength dependence to reflectivity of pump light or transmissivity of signal light, it is possible to equalizing the wavelength dependence of Raman gain.

Figure 4:
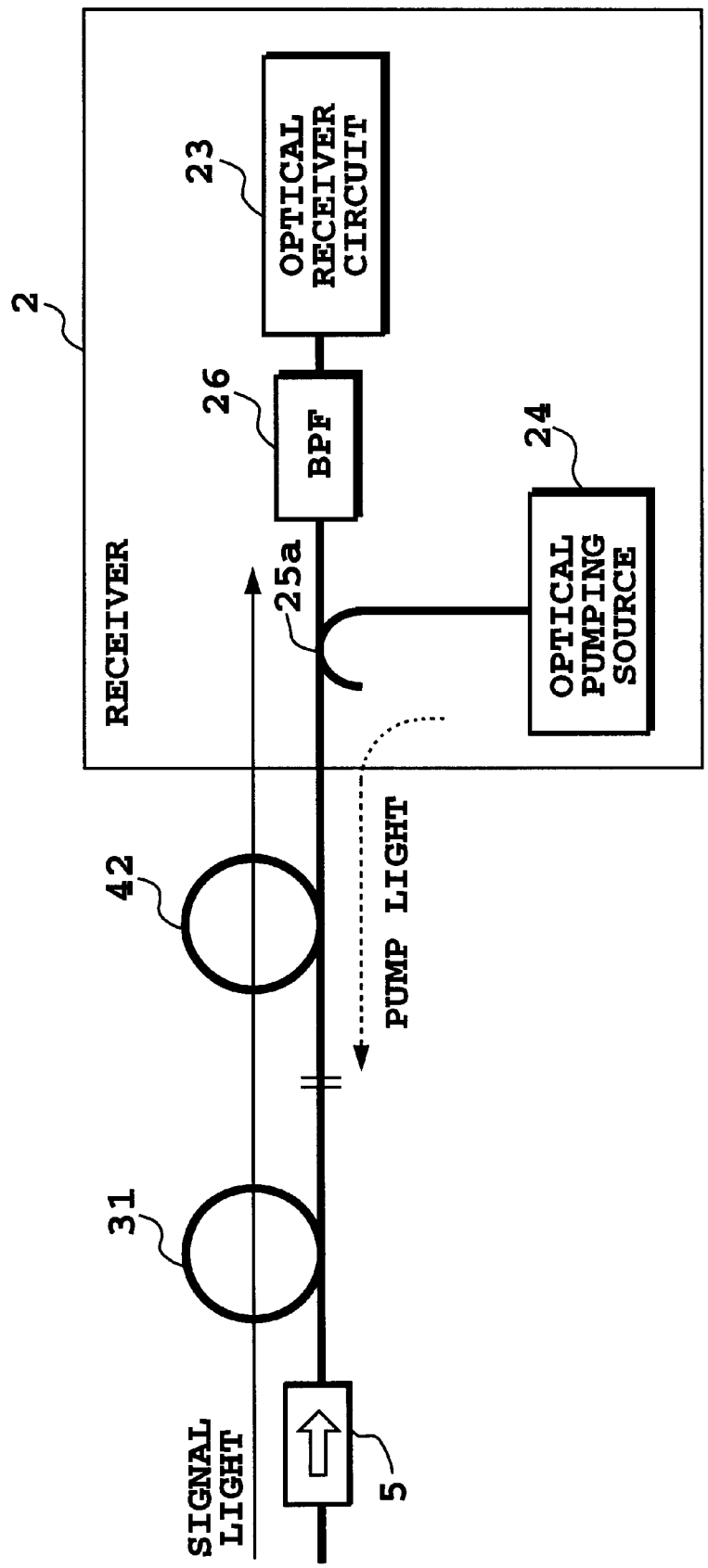
FIG. 4 is a block diagram showing a third embodiment of the optical transmission system according to the present invention.

FIG. 4 shows a third embodiment of the optical transmission system according to the present invention. Here, a configuration is shown in which pump light is launched from the receiver side to the dispersion compensating distributed fiber amplifier, and the configuration of the transmitter is omitted.

The present embodiment is characterized by using an erbium doped dispersion compensating fiber 42 which is doped with erbium in the core and used in place of the dispersion compensating fiber 41 in the first embodiment. The erbium doped dispersion compensating fiber 42 is the reverse in the sign of dispersion and dispersion slope compared to the single mode fiber 31, and is designed so that the dispersion and the dispersion slope are zero in the vicinity of 1.5 $\mu$cm as the entire optical transmission line.

The pump light outputted from the optical pumping source 24 is launched through the WDM coupler 25a to the erbium doped dispersion compensating fiber 42 in the reverse direction to the signal light. Since the erbium doped fiber amplifier has no polarization dependence, a polarization multiplexing circuit in the pumping optical source 24 is not necessarily required. The pump light wavelength is in the vicinity of 1480 nm or 980 nm. An optical circulator may be used in place of the WDM coupler 25a.

The signal light is amplified by the erbium doped dispersion compensating fiber 42, launched to the receiver 2, and received by the optical receiver circuit 23 through the WDM coupler 25a and the optical bandpass filter 26. The optical bandpass filter 26 is used to block amplified spontaneous emission (ASE) generated in the erbium doped dispersion compensating fiber 42.

Figure 5:
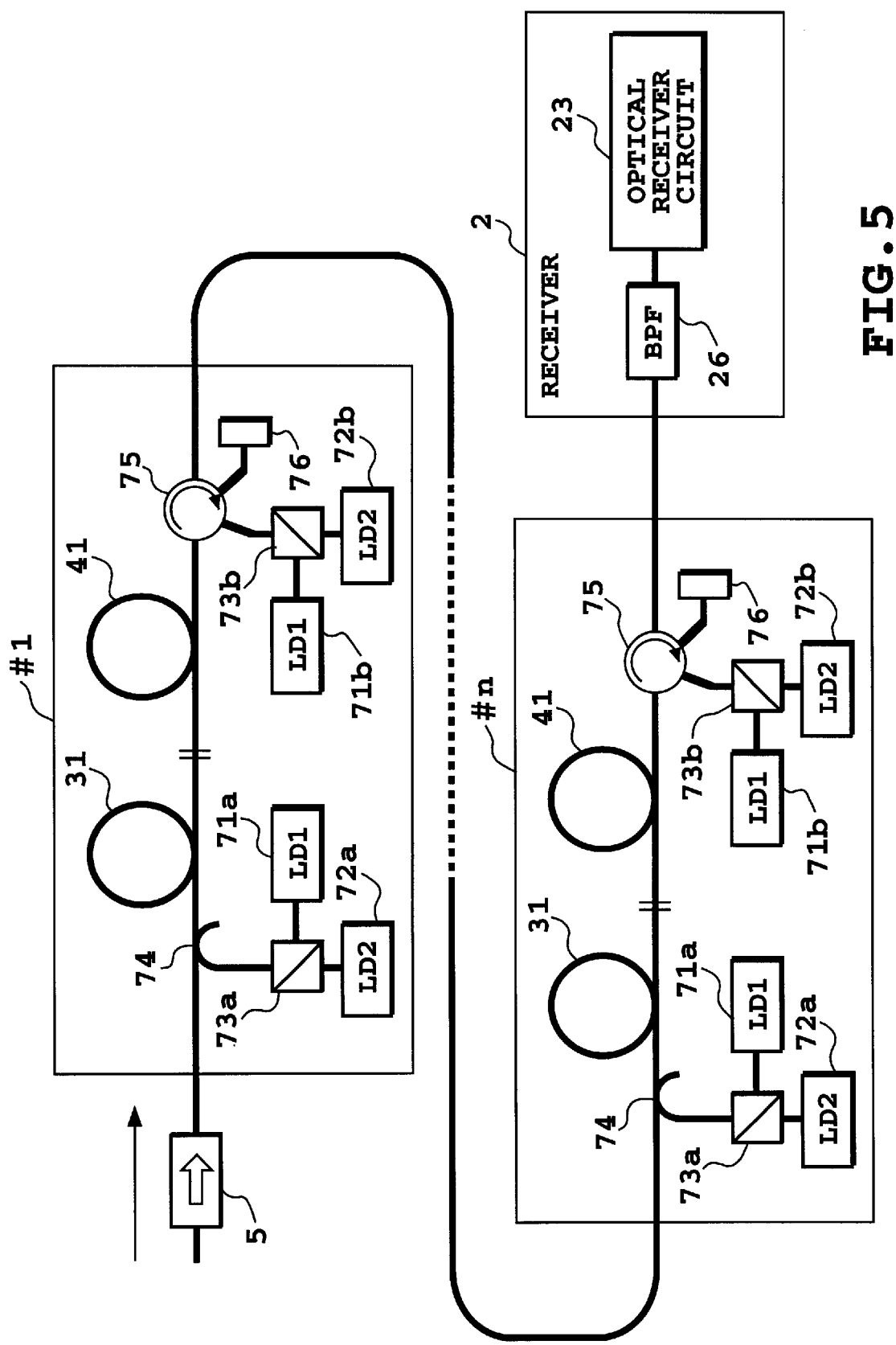
FIG. 5 is a block diagram showing a fourth embodiment of the optical transmission system according to the present invention.
Figure 6:
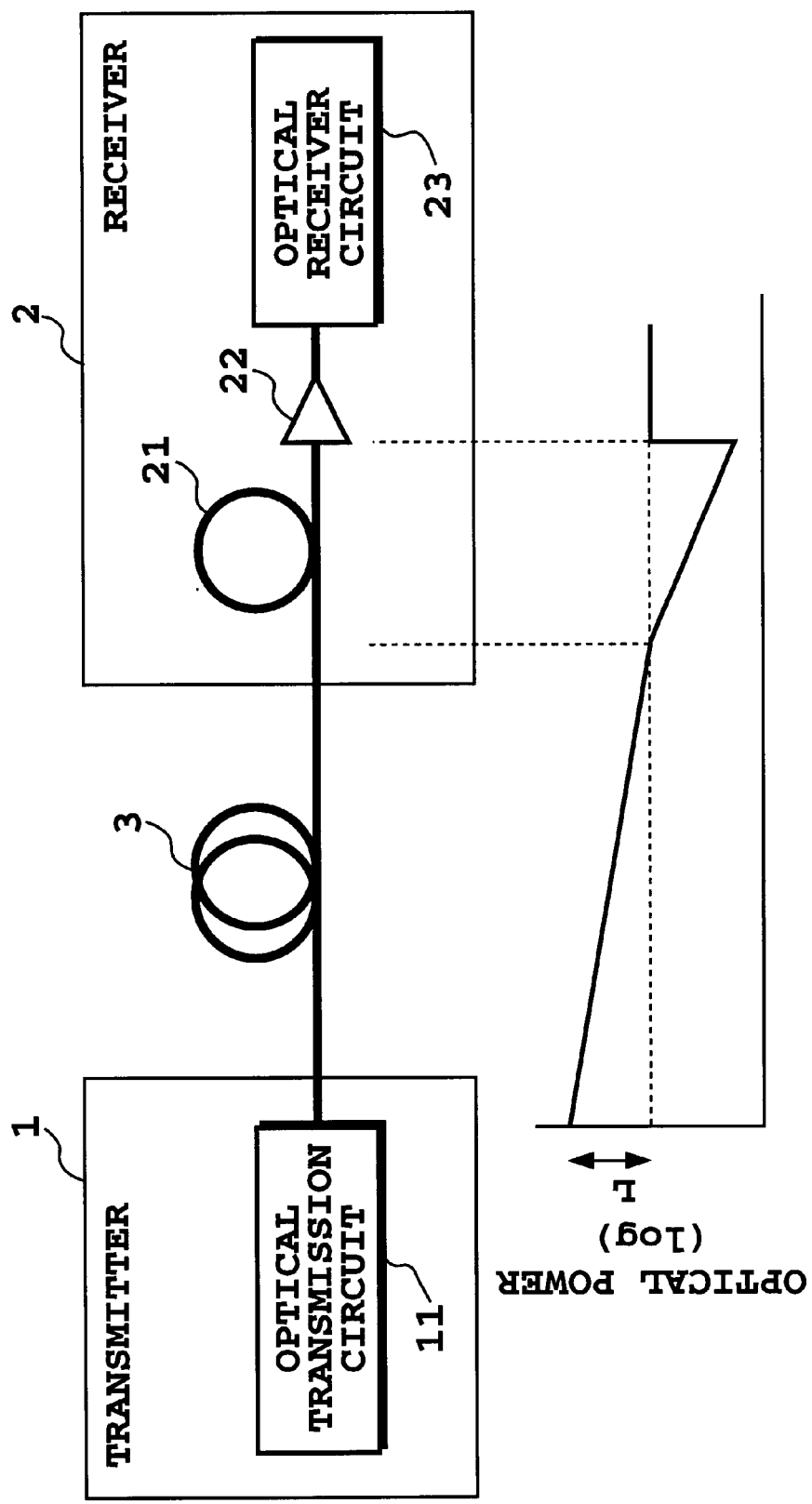
FIG. 6 is a block diagram showing configuration of a prior art optical transmission system.
Figure 7:
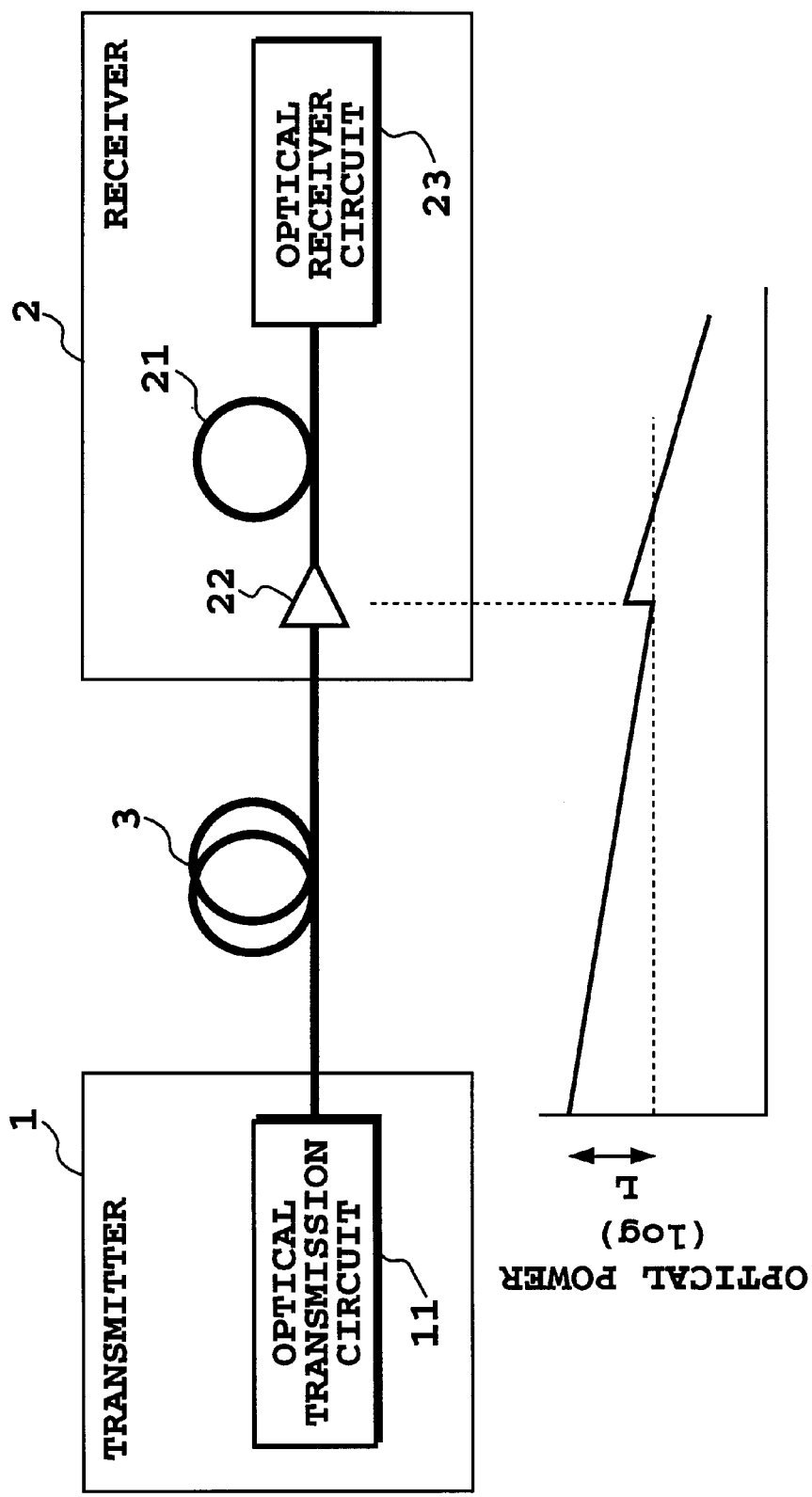
FIG. 7 is a block diagram showing configuration of a prior art optical transmission system.
Figure 8:
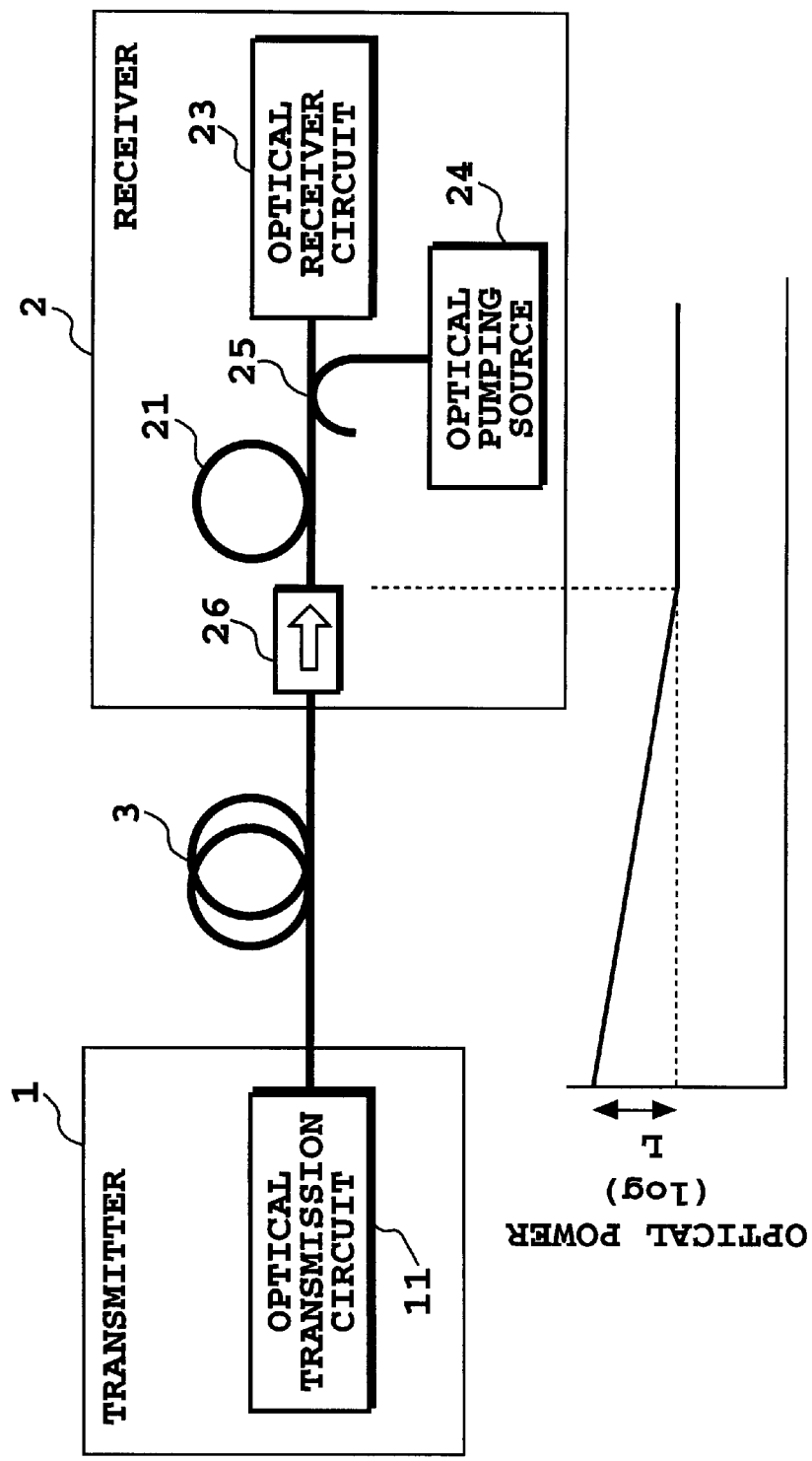
FIG. 8 is a block diagram showing configuration of a prior art optical transmission system.

FIG. 5 shows a fourth embodiment of the optical transmission system according to the present invention.

The present embodiment is characterized in that the optical transmission line is divided into a plurality n of transmission sections, and each transmission section is provided with a optical pumping source for pumping the single mode fiber 31 and the dispersion compensating fiber 41. Transmission sections #1 to #n are quite the same in configuration, each transmission section is required to have a net gain of 0 dB.

The present embodiment has a configuration in which laser light outputted from two semiconductor lasers 71 and 72 as optical pumping sources is polarization multiplexed by a polarization multiplexing circuit 73 and outputted. Further, semiconductor lasers 71a and 72a and a polarization multiplexing circuit 73a are provided as optical pumping sources for forward pumping the single mode fiber 31, and semiconductor lasers 71b and 72b and a polarization multiplexing circuit 73b as optical pumping sources for backward pumping excites the dispersion compensating fiber 41.

Signal light of wavelength 1.5 $\mu$m outputted from the transmission station (out of the figure) is launched to the single mode fiber 31 of the transmission section #1 through the isolator 5. The pump light for forward pumping excites the single mode fiber 31 is polarization multiplexed and launched to the single mode fiber 31 in the same direction as the signal light through the WDM coupler 74. The signal light outputted from the single mode fiber 31 is launched to the dispersion compensating fiber 41. The pump light for backward pumping excites the dispersion compensating fiber 41 is polarization multiplexed and launched to the dispersion compensating fiber 41 in the reverse direction to the signal light through a duplexer 75. An optical circulator may be used in place of the duplexer. Further, both of the forward pumping and backward pumping are not always necessary, and one of them may be omitted.

The carrier frequency difference between the pump light and signal light is set equal to a Raman shift (about 9.5 THz) of silica. The signal light is Raman amplified by the single mode fiber 31 and the dispersion compensating fiber 41, and outputted to the transmission section #2 through the duplexer 75. In the following, in the respective transmission sections, dispersion compensation to the signal light and Raman amplification for compensating for the loss thereof are performed by the same configuration.

The signal light outputted from the transmission section #n is received by the optical receiver circuit 23 through the optical bandpass filter 26 in the receiver 2. The optical bandpass filter 26 is used to block Stokes wave spontaneously emitted in the single mode fiber 31 and the dispersion compensating fiber 41. Back scattering light and backward pump light generated in the transmission section #1 are blocked by the isolator 5. Back scattering light generated in the transmission sections #2 to #n is terminated by a terminator 76 through duplexers 75 of the respective transmission sections, and will never back flow to other transmission sections.

In the present embodiment, the erbium doped dispersion compensating fiber 42 as shown in the third embodiment may be used in each transmission section, so that non-polarization multiplexed pump light is launched.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. An optical transmission system comprising a transmitter and a receiver wherein a transmission optical waveguide is connected with a dispersion compensating optical waveguide designed to cancel a dispersion and a dispersion slope of said transmission optical waveguide as an optical transmission line for transmitting a signal light, said transmission optical waveguide and said dispersion compensating optical waveguide are constructed to have a sufficiently large absolute value of group velocity dispersion per unit length for reducing waveform degradation of signal light due to nonlinear optical effects including four wave mixing and cross-phase modulation in a wavelength band of said signal light to a negligible small value, said transmission line is constructed to have a sufficiently small absolute values of group velocity dispersion and an absolute value of dispersion slope of the entire optical transmission line for reducing waveform degradation of signal light due to group velocity dispersion in a wavelength band of said signal light to a negligible small value, pumping light generation means provided in at least one of said transmitter and said receiver connected to said optical transmission line for generating a polarization multiplexed or non-polarization multiplexed pump light for providing part or all of said optical transmission line with a Raman gain in a wavelength band of said signal light, and means for launching said pump light to said optical transmission line.

2. The optical transmission system as claimed in claim 1, wherein said wavelength band of said signal light is 1500 nm to 1625 nm, said dispersion of said transmission optical waveguide is +5 ps/nm/km to +25 ps/nm/km, and said dispersion slope is +0.01 ps/nm$^2$/km to +0.5 ps/nm$^2$/km at signal wavelength in said wavelength band, said dispersion of said dispersion compensating optical waveguide is −5 ps/nm/km to −100 ps/nm/km, and said dispersion slope is −0.01 ps/nm$^2$/km to −0.5 ps/nm$^2$/km at said signal wavelength in said wavelength band, and said dispersion of the entire transmission line is −0.1 ps/nm/km to +0.1 ps/nm/km, and said dispersion slope is −0.03 ps/nm$^2$/km to +0.03 ps/nm$^2$/km at said signal wavelength in said wavelength band.

3. The optical transmission system as claimed in claim 2, wherein said wavelength band of said signal light is 1500 nm to 1625 nm, for a variable DPS (Dispersion Per Slope) defined as a value obtained by dividing said dispersion by said dispersion slope at said signal wavelength in said wavelength band, a ratio of DPS (tr) as a DPS in said transmission optical waveguide and a DPS (dcf) as a DPS in said dispersion compensating optical waveguide is in a range of 0.9<DPS (tr)/DPS (dcf)<1.1.

4. The optical transmission system as claimed in claim 1, further comprising an optical filter provided in said optical transmission line for reflecting a pump light and transmitting said signal light.

5. The optical transmission system as claimed in claim 4, having a configuration for adjusting a wavelength dependence of reflectivity of pump light or transmissivity of signal light of said optical filter and equalizing the wavelength dependence of gain of said optical transmission line.

6. An optical transmission system comprising a transmitter and a receiver and a repeater wherein a transmission optical waveguide is connected with a dispersion compensating optical waveguide designed to cancel a dispersion and a dispersion slope of said transmission optical waveguide as an optical transmission line for transmitting a signal light, said transmission optical waveguide and said dispersion compensating optical waveguide are constructed to have a sufficiently large absolute value of group velocity dispersion per unit length for reducing waveform degradation of signal light due to nonlinear optical effects including four wave mixing and cross-phase modulation in a wavelength band of said signal light to a negligible small value, said transmission line is constructed to have a sufficiently small absolute value of group velocity dispersion and an absolute value of dispersion slope of the entire optical transmission line for reducing waveform degradation of signal light due to group velocity dispersion in a wavelength band of said signal light to a negligible small value, pumping light generation means provided in at least one of said transmitter, said receiver and said repeater connected to said optical transmission line for generating a polarization multiplexed or non-polarization multiplexed pump light for providing part or all of said optical transmission line with a Raman gain in a wavelength band of said signal light, and means for launching said pump light to said optical transmission line.

7. The optical transmission system as claimed in claim 6, wherein said wavelength band of said signal light is 1500 nm to 1625 nm, said dispersion of said transmission optical waveguide is +5 ps/nm/km to +25 ps/nm/km, and said dispersion slope is +0.01 ps/nm$^2$/km to +0.5 ps/nm$^2$/km at signal wavelength in said wavelength band, said dispersion of said dispersion compensating optical waveguide is −5 ps/nm/km to −100 ps/nm/km, and said dispersion slope is −0.01 ps/nm$^2$/km to −0.5 ps/nm$^2$/km at said signal wavelength in said wavelength band, and said dispersion of the entire transmission line is −0.1 ps/nm/km to +0.1 ps/nm/km, and said dispersion slope is −0.03 ps/nm$^2$/km to +0.03 ps/nm$^2$/km at said signal wavelength in said wavelength band.

8. The optical transmission system as claimed in claim 7, wherein said wavelength band of said signal light is 1500 nm to 1625 nm, for a variable DPS (Dispersion Per Slope) defined as a value obtained by dividing said dispersion by said. dispersion slope at said signal wavelength in said wavelength band, a ratio of DPS (tr) as a DPS in said transmission optical waveguide and a DPS (dcf) as a DPS in said dispersion compensating optical waveguide is in a range of 0.9<DPS (tr)/DPS (dcf)<1.1.

9. The optical transmission system as claimed in claim 6, further comprising an optical filter provided in said optical transmission line for reflecting a pump light and transmitting said signal light.

10. The optical transmission system as claimed in claim 9, having a configuration for adjusting a wavelength dependence of reflectivity of pump light or transmissivity of signal light of said optical filter and equalizing the wavelength dependence of gain of said optical transmission line.

11. An optical transmission system comprising a transmitter and a receiver wherein a transmission optical waveguide is connected with a dispersion compensating optical waveguide designed to cancel a dispersion and a dispersion slope of said transmission optical waveguide as an optical transmission line for transmitting a signal light, and part or all of said optical transmission line is doped with a rare-earth ions, said transmission optical waveguide and said dispersion compensating optical waveguide are constructed to have a sufficiently large absolute value of group velocity dispersion per unit length for reducing waveform degradation of signal light due to nonlinear optical effects including four wave mixing and cross-phase modulation in a wavelength band of said signal light to a negligible small value, said transmission line is constructed to have a sufficiently small absolute value of group velocity dispersion and an absolute value of dispersion slope of the entire optical transmission line for reducing waveform degradation of signal light due to group velocity dispersion in a wavelength band of said signal light to a negligible small value, pumping light generation means provided in at least one of said transmitter and said receiver connected to said optical transmission line for generating a pump light for providing said rare-earth doped optical transmission line with a distributed gain in a wavelength band of said signal light, and means for launching said pump light to said optical transmission line.

12. The optical transmission system as claimed in claim 11, wherein erbium is used as said rare-earth ions.

13. The optical transmission system as claimed in claim 11, wherein said wavelength band of said signal light is 1500 nm to 1625 nm, said dispersion of said transmission optical waveguide is +5 ps/nm/km to +25 ps/nm/km, and said dispersion slope is +0.01 ps/nm$^2$/km to +0.5 ps/nm$^2$/km at signal wavelength in said wavelength band in said wavelength band, said dispersion of said dispersion compensating optical waveguide is −5 ps/nm/km to −100 ps/nm/km, and said dispersion slope is −0.01 ps/nm$^2$/km to −0.5 ps/nm$^2$/km at said signal wavelength in said wavelength band, and said dispersion of the entire transmission line is −0.1ps/nm/km to +0.1 ps/nm/km, and said dispersion slope is −0.03 ps/nm$^2$/km to +0.03 ps/nm$^2$/km at said signal wavelength in said wavelength band.

14. The optical transmission system as claimed in claim 13, wherein said wavelength band of said signal light is 1500 nm 1625 nm, for a variable DPS (Dispersion Per Slope) defined as a value obtained by dividing said dispersion by said dispersion slope at said signal wavelength in said wavelength band, a ratio of DPS (tr) as a DPS in said transmission optical waveguide and a DPS (dcf) as a DPS in said dispersion compensating optical waveguide is in a range of 0.9<DPS (tr)/DPS (dcf)<1.1.

15. The optical transmission system as claimed in claim 11, further comprising an optical filter provided in said optical transmission line for reflecting a pump light and transmitting said signal light.

16. The optical transmission system as claimed in claim 15, having a configuration for adjusting a wavelength dependence of reflectivity of pump light or transmissivity of signal light of said optical filter and equalizing the wavelength dependence of gain of said optical transmission line.

17. An optical transmission system comprising a transmitter and a receiver and a repeater wherein a transmission optical waveguide is connected with a dispersion compensating optical waveguide designed to cancel a dispersion and a dispersion slope of said transmission optical waveguide as an optical transmission line for transmitting a signal light, and part or all of said optical transmission line is doped with a rare-earth ions, said transmission optical waveguide and said dispersion compensating optical waveguide are constructed to have a sufficiently large absolute value of group velocity dispersion per unit length for reducing waveform degradation of signal light due to nonlinear optical effects including four wave mixing and cross-phase modulation in a wavelength band of said signal light to a negligible small value, said transmission line is constructed to have a sufficiently small absolute value of group velocity dispersion and an absolute value of dispersion slope of the entire optical transmission line for reducing waveform degradation of signal light due to group velocity dispersion in a wavelength band of said signal light to a negligible small value, pumping light generation means provided in at least one of said transmitter, said receiver and said repeater connected to said optical transmission line for generating a pump light for providing said rare-earth doped optical transmission line with a distributed gain in a wavelength band of said signal light, and means for launching said pump light to said optical transmission line.

18. The optical transmission system as claimed in claim 17, wherein erbium is used as said rare-earth ions.

19. The optical transmission system as claimed in claim 17, wherein said wavelength band of said signal light is 1500 nm to 1625 nm, said dispersion of said transmission optical waveguide is +5 ps/nm/km to +25 ps/nm/km, and said dispersion slope is +0.01 ps/nm$^2$/km to +0.5 ps/nm$^2$/km at signal wavelength in said wavelength band, said dispersion of said dispersion compensating optical waveguide is −5 ps/nm/km to −100 ps/nm/km, and said dispersion slope is −0.01 ps/nm$^2$/km to −0.5 ps/nm$^2$/km at said signal wavelength in said wavelength band, and said dispersion of the entire transmission line is −0.1 ps/nm/km to +0.1 ps/nm/km, and said dispersion slope is −0.03 ps/nm$^2$/km to +0.03 ps/nm$^2$/km at said signal wavelength in said wavelength band.

20. The optical transmission system as claimed in claim 19, wherein said wavelength band of said signal light is 1500 nm to 1625 nm, for a variable DPS (Dispersion Per Slope) defined as a value obtained by dividing said dispersion by said dispersion slope at said signal wavelength in said wavelength band, a ratio of DPS (tr) as a DPS in said transmission optical waveguide and a DPS (dcf) as a DPS in said dispersion compensating optical waveguide is in a range of 0.9<DPS (tr)/DPS (dcf)<1.1.

21. The optical transmission system as claimed in claim 17, further comprising an optical filter provided in said optical transmission line for reflecting said pump light and transmitting said signal light.

22. The optical transmission system as claimed in claim 21, having a configuration for adjusting a wavelength dependence of reflectivity of pump light or transmissivity of signal light of said optical filter and equalizing the wavelength dependence of gain of said optical transmission line.

* * * * *